(12) United States Patent
Buer et al.

(10) Patent No.: US 8,295,484 B2
(45) Date of Patent: Oct. 23, 2012

(54) SYSTEM AND METHOD FOR SECURING DATA FROM A REMOTE INPUT DEVICE

(75) Inventors: Mark Buer, Gilbert, AZ (US); Ed Frank, Atherton, CA (US)

(73) Assignee: Broadcom Corporation, Irvine, CA (US)

( * ) Notice: Subject to any disclaimer, the term of this patent is extended or adjusted under 35 U.S.C. 154(b) by 1484 days.

(21) Appl. No.: 11/298,153

(22) Filed: Dec. 9, 2005

(65) Prior Publication Data

US 2006/0133604 A1 Jun. 22, 2006

Related U.S. Application Data

(60) Provisional application No. 60/637,793, filed on Dec. 21, 2004.

(51) Int. Cl.
H04K 1/00 (2006.01)

(52) U.S. Cl. .......................... 380/255; 380/28

(58) Field of Classification Search .............. 380/255, 380/285, 28, 30; 726/9; 713/150
See application file for complete search history.

(56) References Cited

U.S. PATENT DOCUMENTS

| | | |
|---|---|---|
| 4,491,909 A | 1/1985 | Shimizu |
| 4,625,276 A | 11/1986 | Benton et al. |
| 4,645,338 A | 2/1987 | Juliana et al. |
| 4,774,706 A | 9/1988 | Adams |
| RE33,189 E | 3/1990 | Lee et al. |
| 5,161,193 A | 11/1992 | Lampson et al. |
| 5,297,206 A | 3/1994 | Orton |
| 5,329,623 A | 7/1994 | Smith et al. |
| 5,365,589 A | 11/1994 | Gutowitz |
| 5,471,482 A | 11/1995 | Byers et al. |
| 5,608,778 A | 3/1997 | Partridge, III |
| 5,631,960 A | 5/1997 | Likens et al. |
| 5,724,423 A | 3/1998 | Khello |
| 5,734,829 A | 3/1998 | Robinson |
| 5,751,809 A | 5/1998 | Davis et al. |
| 5,796,744 A | 8/1998 | Krawczak et al. |
| 5,796,836 A | 8/1998 | Markham |
| 5,867,706 A | 2/1999 | Martin et al. |
| 5,870,474 A | 2/1999 | Wasilewski et al. |
| 5,898,479 A | 4/1999 | Hubbard et al. |

(Continued)

FOREIGN PATENT DOCUMENTS

EP 0876026 A2 11/1998

(Continued)

OTHER PUBLICATIONS

Japanese Patent Abstract for Appln. No. JP 06-215009, filed Aug. 5, 1994, 1 pg.

(Continued)

*Primary Examiner* — Samson Lemma (74) *Attorney, Agent, or Firm* — Sterne, Kessler, Goldstein & Fox PLLC (57) ABSTRACT

An input device with an integrated security module communicates with a processing component over an insecure medium. The insecure medium may be a wireless network, software stack, or the like. According to one embodiment, the security module is integrated into an existing chip of the input device. Data generated by the input device is encoded and/or authenticated by the security module prior its transmission to the processing device. The processing device receives the input data and processes it within its own security boundary for providing selected services or information to a user or application associated with the input device.

32 Claims, 7 Drawing Sheets

U.S. PATENT DOCUMENTS

| | | | |
|---|---|---|---|
| 5,933,503 | A | 8/1999 | Schell et al. |
| 5,936,967 | A | 8/1999 | Baldwin et al. |
| 5,943,338 | A | 8/1999 | Duclos et al. |
| 5,949,881 | A | 9/1999 | Davis |
| 5,953,416 | A | 9/1999 | Hasebe et al. |
| 5,983,350 | A | 11/1999 | Minear et al. |
| 6,003,135 | A | 12/1999 | Bialick et al. |
| 6,012,048 | A | 1/2000 | Gustin et al. |
| 6,038,551 | A | 3/2000 | Barlow et al. |
| 6,047,270 | A | 4/2000 | Joao et al. |
| 6,085,176 | A | 7/2000 | Woolston |
| 6,101,255 | A | 8/2000 | Harrison et al. |
| 6,111,858 | A | 8/2000 | Greaves et al. |
| 6,115,816 | A | 9/2000 | Davis |
| 6,157,955 | A | 12/2000 | Narad et al. |
| 6,189,100 | B1 | 2/2001 | Barr et al. |
| 6,216,167 | B1 | 4/2001 | Momirov |
| 6,226,710 | B1 | 5/2001 | Melchior |
| 6,256,737 | B1 | 7/2001 | Bianco et al. |
| 6,266,647 | B1 | 7/2001 | Fernandez |
| 6,269,163 | B1 | 7/2001 | Rivest et al. |
| 6,282,658 | B2 | 8/2001 | French et al. |
| 6,295,602 | B1 | 9/2001 | Weissman et al. |
| 6,295,604 | B1 | 9/2001 | Callum |
| 6,320,964 | B1 | 11/2001 | Callum |
| 6,321,339 | B1 | 11/2001 | French et al. |
| 6,327,625 | B1 | 12/2001 | Wang et al. |
| 6,349,405 | B1 | 2/2002 | Welfeld |
| 6,378,072 | B1 | 4/2002 | Collins et al. |
| 6,393,026 | B1 | 5/2002 | Irwin |
| 6,393,411 | B1 | 5/2002 | Bishop et al. |
| 6,393,564 | B1 | 5/2002 | Kanemitsu et al. |
| 6,397,198 | B1 | 5/2002 | Hoffman |
| 6,421,730 | B1 | 7/2002 | Narad et al. |
| 6,477,646 | B1 | 11/2002 | Krishna et al. |
| 6,484,257 | B1 | 11/2002 | Ellis |
| 6,493,347 | B2 | 12/2002 | Sindhu et al. |
| 6,496,936 | B1 | 12/2002 | French et al. |
| 6,609,198 | B1 | 8/2003 | Wood et al. |
| 6,697,489 | B1 | 2/2004 | Candelore |
| 6,701,432 | B1 | 3/2004 | Deng et al. |
| 6,704,871 | B1 | 3/2004 | Kaplan et al. |
| 6,708,273 | B1 | 3/2004 | Ober et al. |
| 6,728,378 | B2 * | 4/2004 | Garib ........................... 380/259 |
| 6,738,749 | B1 | 5/2004 | Chasko |
| 6,745,936 | B1 | 6/2004 | Movalli et al. |
| 6,751,677 | B1 | 6/2004 | Ilnicki et al. |
| 6,751,728 | B1 | 6/2004 | Gunter et al. |
| 6,760,444 | B1 | 7/2004 | Leung |
| 6,778,495 | B1 | 8/2004 | Blair |
| 6,791,947 | B2 | 9/2004 | Oskouy et al. |
| 6,831,979 | B2 | 12/2004 | Callum |
| 6,862,278 | B1 | 3/2005 | Chang et al. |
| 6,892,307 | B1 | 5/2005 | Wood et al. |
| 6,909,713 | B2 | 6/2005 | Magnussen et al. |
| 6,938,156 | B2 * | 8/2005 | Wheeler et al. ............... 713/170 |
| 6,963,843 | B1 | 11/2005 | Takatsu et al. |
| 6,963,979 | B2 | 11/2005 | Fairclough et al. |
| 6,981,140 | B1 | 12/2005 | Choo |
| 6,983,366 | B1 | 1/2006 | Huynh et al. |
| 6,983,374 | B2 | 1/2006 | Hashimoto et al. |
| 6,996,842 | B2 | 2/2006 | Strahm et al. |
| 6,999,943 | B1 | 2/2006 | Johnson et al. |
| 7,003,118 | B1 | 2/2006 | Yang et al. |
| 7,005,733 | B2 | 2/2006 | Kommerling et al. |
| 7,017,042 | B1 | 3/2006 | Ziai et al. |
| 7,039,641 | B2 | 5/2006 | Woo |
| 7,050,993 | B1 | 5/2006 | Piikivi et al. |
| 7,055,029 | B2 | 5/2006 | Collins et al. |
| 7,062,657 | B2 | 6/2006 | Law |
| 7,086,085 | B1 | 8/2006 | Brown et al. |
| 7,086,086 | B2 | 8/2006 | Ellis |
| 7,110,987 | B2 | 9/2006 | Engelhart |
| 7,191,341 | B2 | 3/2007 | Paaske et al. |
| 7,305,562 | B1 | 12/2007 | Bianco et al. |
| 7,434,043 | B2 | 10/2008 | Buer et al. |
| 2001/0001877 | A1 | 5/2001 | French et al. |
| 2002/0001384 | A1 | 1/2002 | Buer et al. |
| 2002/0004904 | A1 | 1/2002 | Blaker et al. |
| 2002/0009076 | A1 | 1/2002 | Engbersen et al. |
| 2002/0023217 | A1 | 2/2002 | Wheeler et al. |
| 2002/0039418 | A1 | 4/2002 | Dror et al. |
| 2002/0044649 | A1 | 4/2002 | Gallant et al. |
| 2002/0057796 | A1 | 5/2002 | Lambert et al. |
| 2002/0078342 | A1 | 6/2002 | Matthews, Jr. |
| 2002/0097724 | A1 | 7/2002 | Halme et al. |
| 2002/0108048 | A1 | 8/2002 | Qi et al. |
| 2002/0138423 | A1 | 9/2002 | Takatori et al. |
| 2002/0191790 | A1 | 12/2002 | Anand et al. |
| 2003/0005144 | A1 | 1/2003 | Engel et al. |
| 2003/0014627 | A1 | 1/2003 | Krishna et al. |
| 2003/0023846 | A1 | 1/2003 | Krishna et al. |
| 2003/0028484 | A1 * | 2/2003 | Boylan et al. .................... 705/40 |
| 2003/0041252 | A1 | 2/2003 | Fung et al. |
| 2003/0046423 | A1 | 3/2003 | Narad et al. |
| 2003/0084308 | A1 | 5/2003 | Van Rijnswou |
| 2003/0084309 | A1 | 5/2003 | Kohn |
| 2003/0105960 | A1 | 6/2003 | Takatori et al. |
| 2004/0039936 | A1 | 2/2004 | Lai |
| 2004/0054914 | A1 | 3/2004 | Sullivan |
| 2004/0083375 | A1 | 4/2004 | Foster et al. |
| 2004/0098600 | A1 | 5/2004 | Eldeeb |
| 2004/0123119 | A1 | 6/2004 | Buer et al. |
| 2004/0123120 | A1 | 6/2004 | Buer et al. |
| 2004/0123123 | A1 | 6/2004 | Buer et al. |
| 2005/0149738 | A1 * | 7/2005 | Targosky ....................... 713/182 |
| 2006/0021041 | A1 | 1/2006 | Challener et al. |
| 2006/0136717 | A1 | 6/2006 | Buer et al. |

FOREIGN PATENT DOCUMENTS

| | | |
|---|---|---|
| EP | 1132800 A2 | 9/2001 |
| JP | 06-215009 | 8/1994 |
| JP | 09-081519 | 3/1997 |
| JP | 2000-76336 | 3/2000 |
| JP | 2000-92236 | 3/2000 |
| WO | WO 92/11598 | 7/1992 |
| WO | WO 01/80483 A2 | 10/2001 |
| WO | WO 02/41599 A1 | 5/2002 |

OTHER PUBLICATIONS

Japanese Patent Abstract for Appln. No. JP 09-081519, filed Mar. 28, 1997, 1 pg.

Japanese Patent Abstract for Appln. No. JP 2000-76336, filed Mar. 14, 2000, 1 pg.

Japanese Patent Abstract for Appln. No. JP 2000-92236, filed Mar. 30, 2000, 1 pg.

FPGA implementation of MD5 hash algorithm; Deepalumara, J.; Heys, H.M.; Venkatesan, R.; Canadian Conference on Electrical and Computer Engineering, 2001. vol. 2, May 13-16,2001, pp. 919-924.

Accelerating application-level security protocols; Burnside, M.; Keromytis, A.D.; The 11 the IEEE International Conference on Networks, 2003. ICON 2003, Sep. 28-Oct. 1, 2003, pp. 313-318.

Securing Web servers against insider attack; Jiang, S.; Smith, S.; Minami; K.; Proceedings 17th Annual Computer Security Applications Conference, 2001. ACSAC 2001. Dec. 10-14, 2001, pp. 265-276.

"Server ECS", Mar. 9, 1998, [Retrieved from Internet Sep. 2, 2004], "http://home.expertcanmore.net/expert/servers.htm".

IPSec Overview, Jun. 5, 2001, [Retrieved from Internet Sep. 2, 2004], "http://forsitesolutions.com/Techstuff/freeswan/inside_overview.html".

"RFC 2402", Oct. 1998, [Retrieved from Internet Sep. 3, 2004], "http://www.ietf.org/rfc/rfc2402.txt?number=2402".

Secure Products VMS115, VLSI Technology, Inc., Printed in USA, Document Control: VMS115, VI, 0, Jan. 1999, pp. 1-2.

VMS 115 Data Sheet, VLSI Technology, Inc., a subsidiary of Philips Semiconductors, Revision 2:3, Aug. 10, 1999, pp. 1-64.

Data Sheet 7751 Encryption Processor, Network Security Processors, Jun. 1999, pp. 1-84.

Senie, D., "NAT Friendly Application Design Guidelines", Amaranth Networks, Inc., NAT Working Group, Internet-Draft, Sep. 1999, pp. 1-7.

Floyd, Sally, et al., "Random Early Detection Gateways for Congestion Avoidance", Lawrence Berkeley Laboratory, University of California, IEEE/ACM Transactions on Networking, Aug. 1993, pp. 1-32.
Egevang, K., et al., "The IP Network Address Translator (NAT)", Network Working Group, May 1994, pp. 1-10.
Pall, G. S., et al., "Microsoft Point-To-Point Encryption (MPPE) Protocol", Microsoft Corporation, Network Working Group, Internet Draft, Oct. 1999, pp. 1-12.
Deutsch, P., "DEFLATE Compressed Data Format Specification Version 1.3", Aladdin Enterprises, Network Working Group, May 1996, pp. 1-17.
Kent, S., "IP Authentication Header", Network Working Group, Nov. 1998, pp. 1-22.
Kent, S., et al., "IP Encapsulating Security Payload (ESP)", Network Working Group, Nov. 1998, pp. 1-22.
Maughan, D, et al., "Internet Security Association and Key Management Protocol (ISAKMP)", Network Working Group, Nov. 1998, pp. 1-20.
Harkins, D., et al., "The Internet Key Exchange (IKE)", Cisco Systems, Network Working Group, Nov. 1998, pp. 1-12.
Srisuresh, P., "Security Model with Tunnel-mode Ipsec for NAT Domains", Lucent Technologies, Network Working Group, Oct. 1999, pp. 1-11.
Shenker, S., "Specification of Guaranteed Quality of Service", Network Working Group, Sep. 1997, pp. 1-20.
Srisuresh, P., et al., "IP Network Address Translator (NAT) Terminology and Considerations", Lucent Technologies, Network Working Group, Aug. 1999, pp. 1-30.
Kent, S., et al., "Security Architecture for the Internet Protocol", Network Working Group, Nov. 1998, pp. 1-66.
Compression for Broadband Data Communications, BlueSteel Networks, Inc., Sep. 8, 1999, pp. 1-9.
Securing and Accelerating e-Commerce Transactions, BlueSteel Networks, Inc., Revision 2.0, Oct. 20, 1999, pp. 1-7.
Securing Broadband Communications BlueSteel Networks, Inc., Sep. 8, 1999, pp. 1-10.
Keromytis, et al., "Implementing IPsec", Global Telecommunications Conference (Globecom), IEEE, Nov. 3, 1997, pp. 1948-1952.
Pierson, et al., "Context-Agile Encryption for High Speed Communication Networks", Computer Communications Review, Association for Computing Machinery, vol. 29, No. 1, Jan. 1999, pp. 35-49.
Sholander, et al., "The Effect of Algorithm-Agile Encryption on ATM Quality of Service", Global Telecommunications Conference (Globecom), IEEE, Nov. 3, 1997, pp. 470-474.
Smirni, et al., "Evaluation of Multiprocessor Allocation Policies", Technical Report, Vanderbilt University, Online, 1993, pp. 1-21.
Tarman, et al., "Algorithm-Agile Encryption in ATM Networks", IEEE Computer, Sep. 1998, vol. 31, No. 1, pp. 57-64.
Wassal, et al., "A VLSI Architecture for ATM Algorithm-Agile Encryption", Proceedings Ninth Great Lakes Symposium on VLSI, Mar. 4-6, 1999, pp. 325-328.
Analog Devices: "Analog Devices and IRE Announce First DSP-Based Internet Security System-On-A-Chip", Analog Devices Press Release, Online, Jan. 19, 1999, pp. 1-3. http://content.analog.com/pressrelease/prdisplay/0,1622,1 6,00.html.
3Com: "3Com Launches New Era of Network Connectivity", 3Com Press Release, Jun. 14, 1999, pp. 1-3.
Analog Devices: "ADSP2141 SafeNetDPS User's Manual, Revision 6", Analog Devices Technical Specifications, Mar. 2000, XP002163401, 87 Pages.
C. Madson, R. Glenn: "RFC 2403—The Use of HMAC-MD5-96 within ESP and AH", IETF Request for Comments, Nov. 1998, XP002163402, Retrieved from Internet on Mar. 20, 2001, http://www.faqs.org/rfcs/frc2403.html, 87 Pages.
S. Kent, R. Atkinson: "RFC 2406-IP Encapsulating Security Payload (ESP)" IETF Request for Comments, Nov. 1998, XP002163400, Retrieved from the Internet on Mar. 20, 2001, http://www.faqs.org/rfcs/frc2406.html, 5 Pages.
R. Sedgewick, "Algorithms in C—Third Edition", 1998, Addison Wesley XP002163543, pp. 573-608.
Applied Cryptography, Second Edition, Schneider, B., 1996, John Wiley & Sons, New York, XP002184521, cited in the application, p. 442, paragraph 18.7—p. 445.
Sha: The Secure Hash Algorithm Putting Message Digests to Work, Stallings, W., Dr. Dobbs Journal, Redwood City, CA, Apr. 1, 1994, p. 32-34, XP000570561.
European Search Report for European Patent Appl. No. EP 03029195, mailed Nov. 2, 2005, search completed on Oct. 20, 2005, Munich.
Erich Nahum, David J. Yates, Sean O'Malley, Hilarie Orman, and Richard Schroeppel; "Parallelized Network Security Protocols"; 1996 IEEE; pp. 145-154.
Surech et al, "Classification Engine in a Cryptography Acceleration Chip", U.S. Appl. No. 09/610,722 filed Jul. 6, 2000, 43 pgs.
Surech et al, "Distributed Processing in a Cryptography Acceleration Chip", U.S. Appl. No. 09/610,798 filed Jul. 6, 2000, 44 pgs.

* cited by examiner

SYSTEM AND METHOD FOR SECURING DATA FROM A REMOTE INPUT DEVICE

CROSS-REFERENCE TO RELATED APPLICATIONS

This application claims the benefit of U.S. Provisional Application No. 60/637,793, filed on Dec. 21, 2004, the content of which is incorporated herein by reference. This application is related in subject matter to U.S. Provisional application No. 60/615,290 entitled "Stateless Hardware Security Module", filed on Oct. 1, 2004, the content of which is incorporated herein by reference.

TECHNICAL FIELD

This application relates to data communication systems, and more specifically, to securing data transmitted by remote input devices to their respective processing components.

BACKGROUND

Input devices transmit data for processing by their respective processing components. Such data may include sensitive information such as, for example, a user's biometric information or the user's personal and financial information. The processing component may provide selected services or information to the user based on the received data.

It is desirable for sensitive information to traverse from the input device to the processing component securely, unchanged and unseen by unauthorized people. Current mechanisms for securing data transmitted by an input device include placing the input device within the security boundary of the processing component. Because communication between the input component and the processing component occurs within the security boundary of the processing component, any data transmitted by the input device to the processing component may be assumed to remain secure.

A drawback to the above solution is the constraint that it places on the location of the input device. That is, with the above solution, the input device must generally be co-located in the same security device as the processing component, such as, for example, within the same hardware security module (HSM). Accordingly, a need exists for improved techniques for securing data transmitted by input devices to their respective processing components when such data traverses an insecure medium.

SUMMARY

According to one embodiment, the present invention is directed to a secure data processing method that employs a security module integrated into an input device. The data processing method includes generating input data via the input device, securing the input data at the input device via the integrated security module, and transmitting the secured input data over an insecure medium. A processing component receives the secured input data and processes the secured input data within a security boundary of the processing component.

According to another embodiment, the present invention is directed to a secure data processing system that includes an input device generating input data and an associated processing component. The input device includes an integrated security module for securing the input data and transmitting the secured input data over an insecure medium. The processing component receives the secured input data over the insecure medium and processes the input data within a security boundary of the processing component.

According to a further embodiment, the present invention is directed to a data input device that includes an integrated security module for securing input data generated at the input device, and a data streaming interface for transmitting the secured input data over an insecure medium. A processing component receives the secured input data over the insecure medium and processes the input data within a security boundary of the processing component.

According to one embodiment, the securing of the input data may include generating an asymmetric key pair including a private key and a public key. The private key is stored within the security module and the public key is exported to the processing component. The asymmetric key pair is generated within a security boundary provided by the security module. A secure data communications channel is established over the insecure medium based on the asymmetric key pair.

According to another embodiment, the securing of the input data may include generating a symmetric key. The security module encodes or authenticates the input data based on the symmetric key.

According to one embodiment, the input device is a sensor such as, for example, a biometric sensor.

According to one embodiment, the insecure medium is a wireless network and/or software.

According to another embodiment, the present invention is directed to a secure data processing method that includes providing to a processing component an identifier for an input device, exporting a first cryptographic key to the processing component, and securely providing to the input device a second cryptographic key using the first cryptographic key. The method further includes generating input data via an input device, securing the input data at the input device using the second cryptographic key, and transmitting the secured input data over an insecure medium.

The first cryptographic key may be a public portion of an asymmetric key, and the second cryptographic key may be a symmetric key. The input data may be encrypted at the input device using the symmetric key.

Thus, according to the various embodiments of the present invention, data may be securely transmitted from an input device to a remote processing component even if such data traverses an insecure medium.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION

Figure 1:
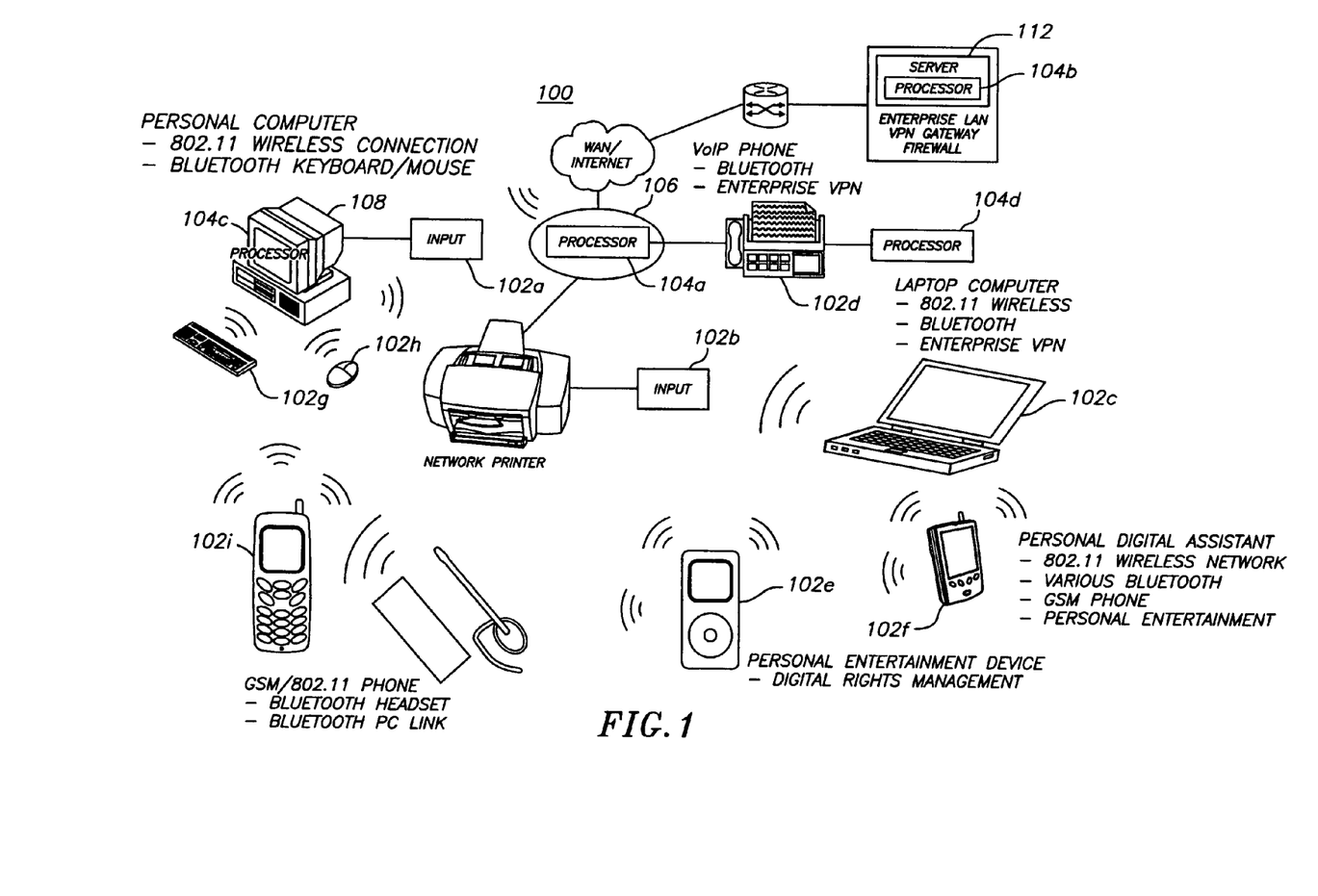
FIG. 1 is a simplified schematic diagram of a networking environment in which various embodiments of the present invention are implemented.

FIG. 1 is a simplified schematic diagram of a networking environment 100 in which various embodiments of the present invention are implemented. The networking environment 100 includes a plurality of remote input devices 102a-102i (collectively referred to as 102) configured to securely transmit data to their respective processing components 104a-104d (collectively referred to as 104) over a traditionally insecure medium. An input device may be deemed to be remote from its processing component even if they both reside in a single device, such as, for example, a personal computer (PC), if the input device is outside of the security boundary associated with the processing component.

The insecure medium may be any hardware, software, or firmware that resides outside the security boundary of a corresponding processing component 104 receiving and using input data transmitted over the insecure medium. As such, data transmitted over the insecure medium may be vulnerable to viruses and/or hacker attacks.

According to one example, the insecure medium is a wireless network implemented using one or more of a wide variety of wireless solutions. For example, the wireless network may include, without limitation, a cellular telephone network such as a Global System for Mobile communications (GSM) or General Packet Radio Service (GPRS), a wireless local area network such as 802.11a, 802.11b, or 802.11g (collectively referred to as 802.11), or a personal area network such as Bluetooth.

Examples of the input devices 102 communicating over the traditionally insecure medium include, but are not limited to wired or wireless peripheral devices such as keyboards, printers, biometric readers/sensors, card readers/sensors, cameras, scanners, scales, and the like. The input devices 102 may further include mobile devices such as, for example, personal computers, laptops, cellular phones, handsets, headsets, personal digital assistants (PDAs), personal entertainment devices, and the like.

The processing components 104 may be hardware, software, and/or firmware components configured to securely process and use data transmitted by their respective input devices 102. For example, processing component 104a may reside in a network access point 106 such as, for example, a network router, and may receive input data provided by input devices 102a-102f for authorizing access to various network devices and services. Input 102a may be a biometric sensor or reader in a personal computer 108 communicating with the access point 106 over an 802.11 wireless connection. Input 102b may be a smart card reader in a network printer or another network device communicating with the access point 106 over a wired connection. Input 102d may be a keypad or another input device in a voice-over-internet-protocol (VoIP) telephone 110 communicating with the access point 106 over a wired connection. In addition, input 102c may be a laptop computer, input 102e may be an entertainment device, and input 102f may be a personal digital assistant (PDA), all of which communicate with the access point 106 over an 802.11 and/or Bluetooth connection. The PDA 102f may further include a cellular telephone that supports, for example, GSM.

According to one embodiment, the authorization process may also be conducted by a remote access server 112 having processing component 104b.

According to one embodiment, base devices such as, for example, the personal computer 108 and the VoIP phone 110 support 802.11 and/or Bluetooth protocols for wireless communication with various peripheral input devices. In this regard, the PC 108 includes a processor 104c for processing input data provided by a Bluetooth-enabled keyboard 102g and mouse 102h. Furthermore, the VoIP phone 110 includes a processor 104d for processing input data provided by a Bluetooth-enabled handset 102i. The handset may also take the form of a cellular phone supporting the GSM protocol, or a wireless phone supporting the 802.11 protocol.

In general terms, any of the above-described input devices 102 communicates with its processing component 104 via the insecure medium. However, although the actual data path used for the communication may not be secure, the information that is transmitted is in effect made secure by sending it over a secure communications channel. The secure communications channel allows data generated by the input device to be securely provided to the receiving processing component that processes and uses the input data within its own security boundary.

Figure 2:
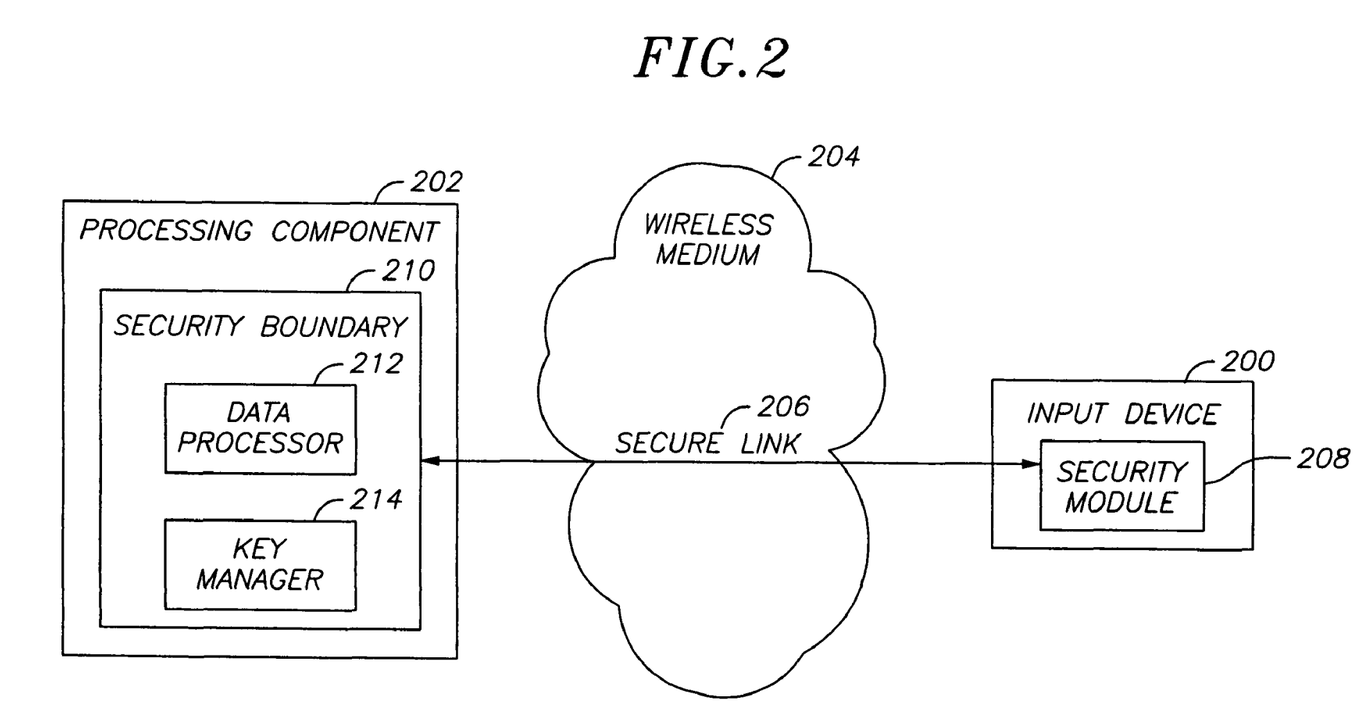
FIG. 2 is a schematic block diagram of an input device communicating with a processing component over an insecure medium.

FIG. 2 is a schematic block diagram of an input device 200 communicating with a processing component 202 over an insecure medium 204. In the illustrated embodiment, the insecure medium is a wireless network. The input device 200 and processing component 202 may be similar to the input device 102 and processing component 104 described above with reference to FIG. 1.

The input device 200 illustrated in FIG. 2 includes an integrated security module 208 configured to establish a secure communications channel (also referred to as a secure link) 206 with the processing component 202. The security module 208 may be implemented in hardware and/or software depending on the level of security desired. For example, the more sensitive the data transmitted by the input device, the higher the desired level of security.

According to one embodiment of the invention, the security module 208 is implemented as a stateless hardware security module (SHSM), such as one described in U.S. Provisional Application No. 60/615,290. The SHSM may be integrated into a previously existing chip, such as, for example, a main processor, of the input device 200. In this scenario, data generated by the input device is encrypted and/or signed by the security module 208 before it leaves the hardware boundary of the chip. Thus, the SHSM provides a high level of security at a relatively low cost, while consuming a relatively small amount of space of the existing chip.

The security module 208 is configured to establish the secure link 206 with the processing component 202. According to one embodiment of the invention, the security module 208 engages in key negotiations with the processing component 202 for establishing the secure link. For example, the security module 208 may engage in asymmetric key negotiations with the processing component where a private portion of the asymmetric key is generated and stored in the security module, and the public portion of the asymmetric key exported to the processing component.

Once a secure link is established between the input device and the processing component, the processing component may safely transmit one or more complementary keys used for encryption, decryption, authentication, signing, and/or verification (collectively referred to as cryptographic processing). The complementary keys may be generated by a key manager 214 resident in the processing component. The key manager 214 may be implemented as a hardware security module (HSM), trusted platform module (TPM), or the like.

The complementary keys may be safely transmitted to the input device over the secure link and used by the security module 208 to encrypt and/or sign data generated by the input device. The complementary keys may further be used by the processing component 202 to decrypt and/or verify data received from the input device 200. A data processor 212 working within a security boundary 210 of the processing component 202 processes and uses the decrypted and/or verified data in an appropriate manner. According to one embodiment of the invention, the asymmetric keys themselves may be used for the cryptographic processing of the input data.

The processing component 202 receives the encrypted and/or signed data, and processes and uses the data within its own security boundary 210. The security boundary 210 of the processing component may be provided in a conventional manner, or using any of the techniques described in U.S. Provisional Application No. 60/615,290. For example, the security boundary 210 may be provided and enforced by the key manager.

The security module 208, therefore, provides a secure usage environment of the input data that may be remotely separated from, yet cryptographically secured to, the processing component 202. Furthermore, if the security module 208 is incorporated into a chip making up the input device 200, data generated by the input device is processed cryptographically before it leaves the hardware boundary of the chip, providing added security for the data.

Figure 3:
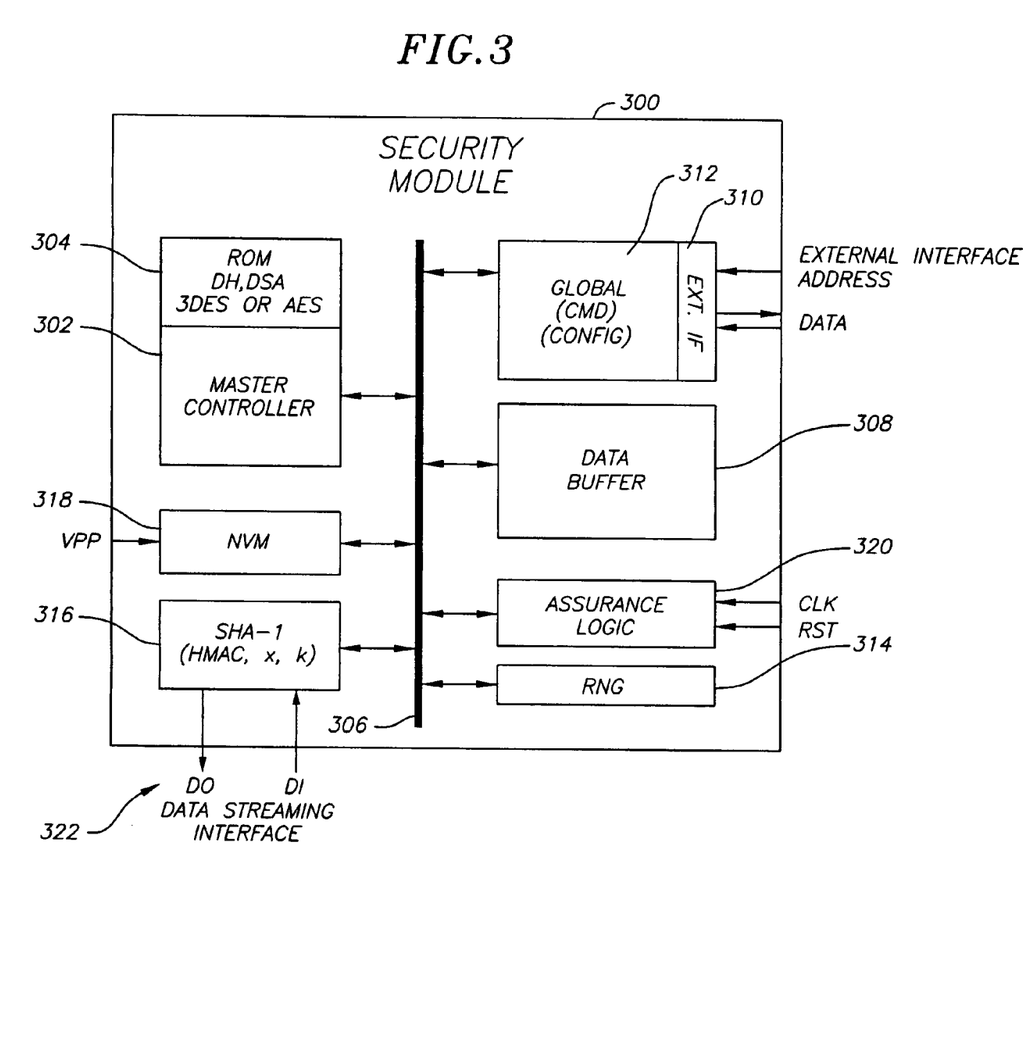
FIG. 3 is a block diagram of a security module according to one embodiment of the invention.

FIG. 3 is a block diagram of a security module 300 that may be integrated into the input device 200 of FIG. 2 according to one embodiment of the invention. The security module 300 includes a master controller 302 for controlling the overall operation of the module. For example, the controller may control boot operations, and data and key traffic flow into and out of the module. The controller may include, for example, a processor and associated code stored in a memory 304, and/or a state machine or other hardware. The controller and/or any other component in the security module may communicate with other components in the security module via an internal bus 306.

A bi-directional external interface 310 provides a mechanism to send keys and/or data to, or receive keys and/or data from, the module. For example, the external interface may include registers that may be written to or read by the controller and external devices that are connected to the security module. In this case, the controller 302 may be configured so that it never writes certain data (e.g., unencrypted keys) to the registers.

The external data interface 310 may be used by a local host to read global registers, issue commands and place data into the data buffer 308 for processing by the security module 300. The external interface may be controlled through a global register block 312 by the master controller 302. These global registers may include, for example, command ("CMD"), timer and configuration ("CONFIG.") registers. The master controller transfers the data between the global registers block and the data buffer 308.

According to one embodiment of the invention, the security module 300 generates one or more keys internally via a number generator (RNG) 314. Typically, the RNG 314 is used to generate an asymmetric key. The private portion of the asymmetric key is stored in a nonvolatile data memory (NVM) 318. The NVM may include, for example, a one-time programmable (OTP) memory or battery backed memory (BBMEM).

The security module includes a mechanism for exporting the public version of the asymmetric key. For example, the public value may be loaded into the external interface 310 so that it may then be read by an external device.

In some embodiments, one or more keys (e.g., the root, identity key for the module) may be injected into the stateless module. This may be performed, for example, when the chip is manufactured, when the chip is tested, during manufacture at an OEM (e.g., circuit board manufacturer), during OEM testing, or during installation for the end user. The injected key may then be used to generate the asymmetric and/or symmetric keys.

Cryptographic processing to acquire or use keys, or to cryptographically process data flowing though the module, may be implemented via the master controller 302 that makes use of codes stored in the memory 304. For example, the memory 304 may store application codes for cryptographic algorithms such as, for example, asymmetric key algorithms (e.g. digital signature algorithm, RSA algorithm, or Diffie-Hellman public key algorithm), key exchange protocols or symmetric key algorithms (e.g. 3DES or AES), or authentication algorithms (e.g. HMAC SHA-1). According to one embodiment, the various algorithms may also be implemented via one or more dedicated processors. For example, a separate cryptographic processor 316 may be used for symmetric key operations.

In some embodiments, a bi-directional interface 322 receives an incoming data stream (DI) from the input device 200 and signs it using an authentication algorithm, or encrypts it using a symmetric encryption algorithm. The signed and/or encrypted data stream (DO) is sent to the processing component 202 via the bi-directional interface 322 or external interface 310.

The security module 208 may also include a security assurance logic block 320 that protects the security module from system security attacks.

Figure 4:
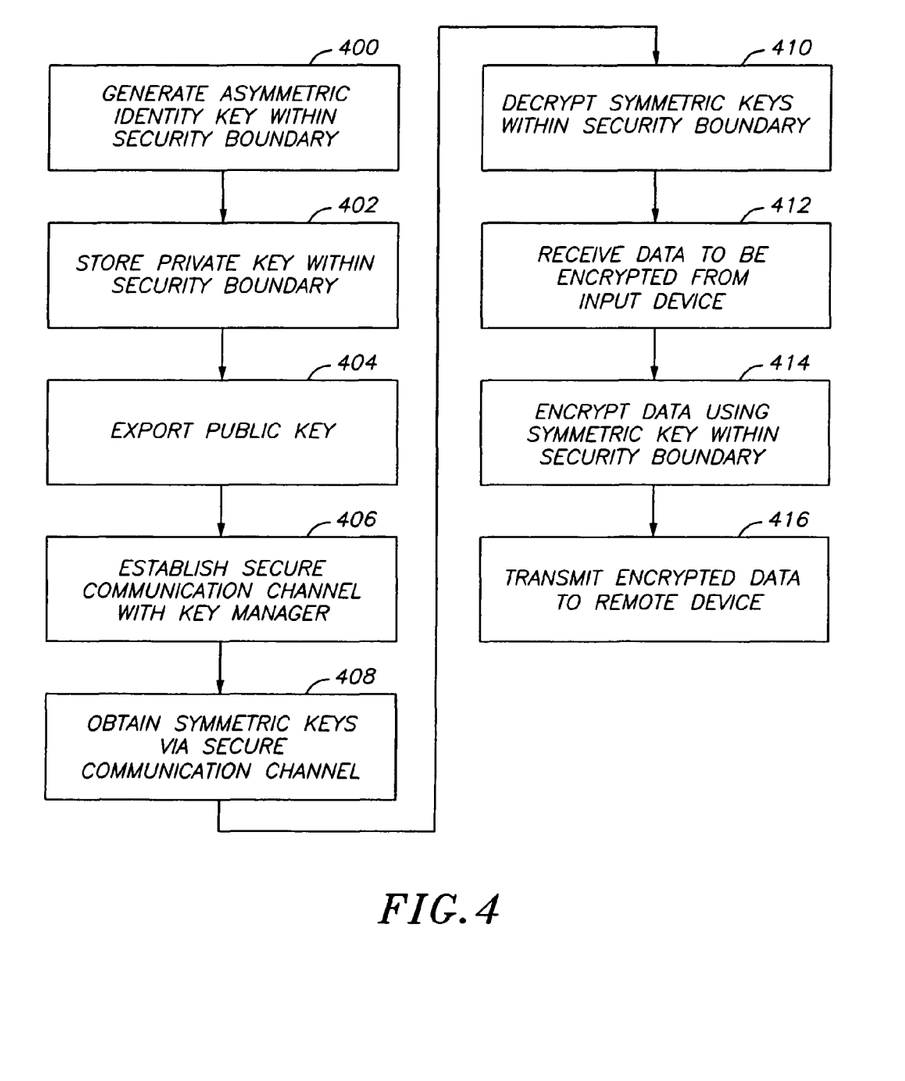
FIG. 4 is a flow diagram of a process executed by the security module of FIG. 3 for securely communicating with a processing component according to one embodiment of the invention.

FIG. 4 is a flow diagram of a process executed by the security module 300 of FIG. 3 for securely communicating with the processing component 202 according to one embodiment of the invention. In step 400, the security module generates a public-private key pair, and in step 402, stores the private key in the nonvolatile memory 318. In step 404, the security module 300 exports the public key and establishes the secure link with the key manager 214 resident in the processing component 202.

In step 406, the key manager 214 sends one or more symmetric keys to the security module 300 via the secure link 206. For example, the key manager may send symmetric keys that are used to encrypt data generated by the input device 200. In this regard, the key manager may encrypt the one or more symmetric keys with the public key prior to transmitting it to the input device. In step 410, the security module 300 invokes the master controller and/or dedicated cryptographic processor 316 to decrypt the symmetric keys via the stored private key.

In step 412, the security module receives data to be encrypted from an input device 200. In step 414, the security module uses the symmetric keys to encrypt the data. Then, in step 416, the security module sends the encrypted data to the processing component 202.

Figure 5:
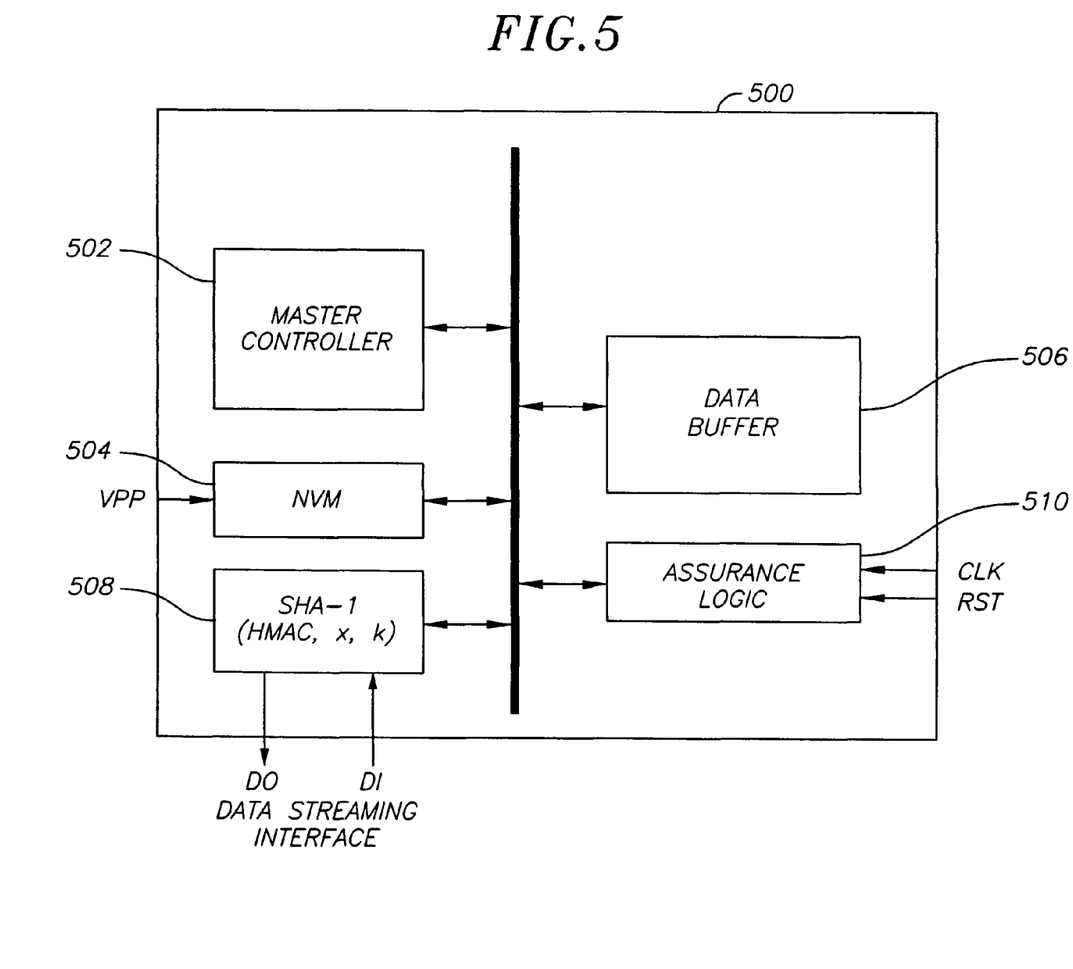
FIG. 5 is a block diagram of a security module having a symmetric key injected during a manufacturing flow.

In some embodiments, the symmetric key may be injected into the security module during a manufacturing flow. FIG. 5 is a block diagram of a security module 500 according to this embodiment. Because the symmetric key is injected into the security module 500, the module may not need to engage in key negotiations with the processing component 202. Thus, the external interface 310, the RNG 314, and the asymmetric key processing circuitry illustrated in FIG. 3 may not be needed. The security module 500 according to this embodiment may simply include a relatively small master controller 502 for injecting the symmetric key and performing other basic operations, a nonvolatile memory 504 for storing the injected key, a data buffer 506, a cryptographic processor 508 for the symmetric key operations, and optionally, an assurance logic 510.

Figure 6:
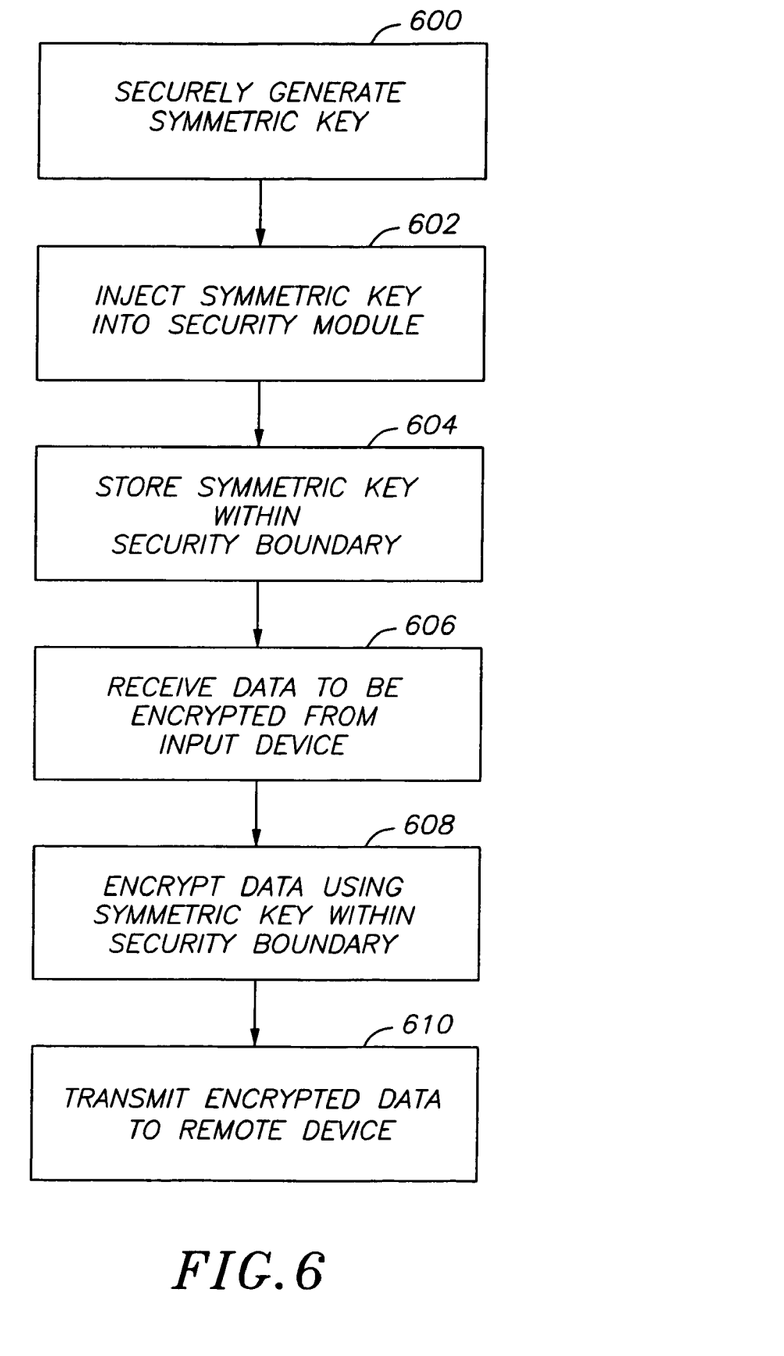
FIG. 6 is a flow diagram of a process executed by the security module of FIG. 5 for securely communicating with a processing component according to one embodiment of the invention.

FIG. 6 is a flow diagram of a process executed by the security module 500 of FIG. 5 for securely communicating with the processing component 202 according to one embodiment of the invention. In step 600, a symmetric key for the security module 500 is generated in a secure manner. For example, the key may be generated in an HSM that is located in a secured location in a manufacturing facility. Alternatively, the key may be generated within a protected key manager such as, for example, a TPM.

In step 602, the symmetric key is injected into the security module. Again, this may be done in a secure environment. For example, the chip for the security module may be moved to the manufacturing facility, or the key sent from a protected key manager, such as, for example, a TPM, via a direct connection. As an example, when the security module 500 is located on the same device as the TPM, a link that cannot be compromised by software attacks may be provided between these two components. Typically this would involve not routing the data through the software stack, not storing it in memory that is accessible by software, and not routing it over a bus that may be readily monitored. In step 604, the security module stores the symmetric key within its security boundary.

In step 606, the security module may then receive data to be encrypted from the input device 200, use the symmetric key within the security boundary to encrypt the data, and send the encrypted data to the processing component 202.

Figure 7:
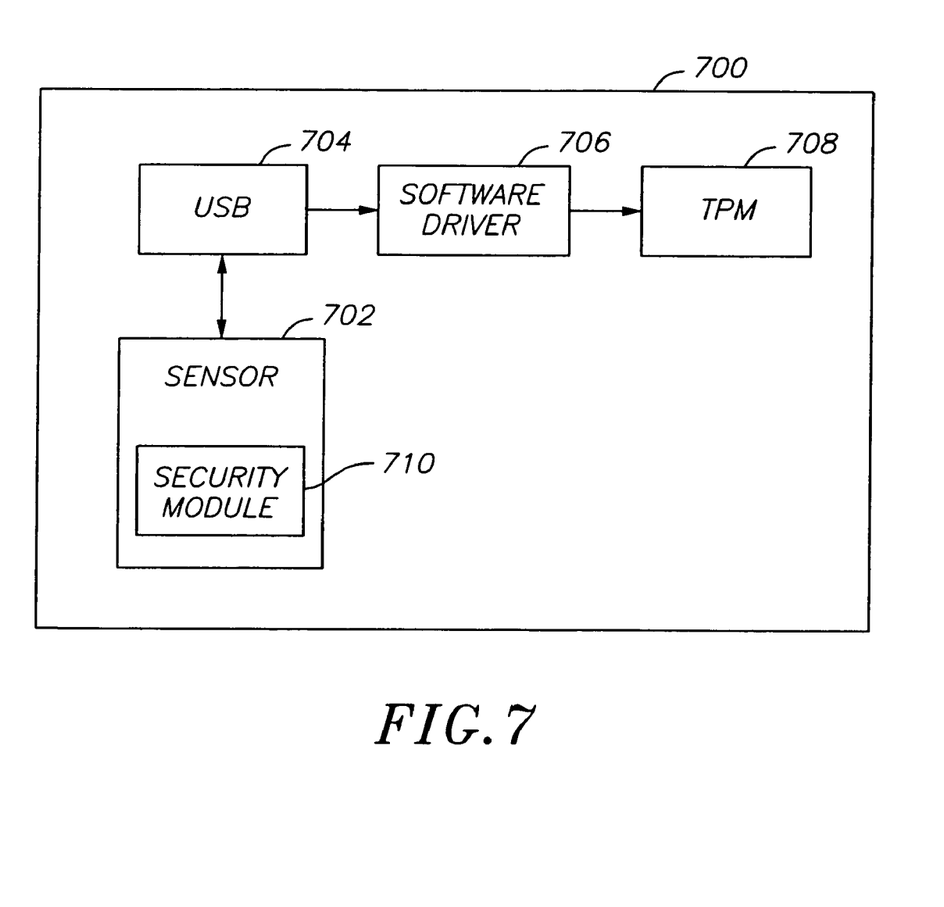
FIG. 7 is a block diagram of a computer device including an input device remotely coupled to a processing component making use of input data transmitted by the input device.

FIG. 7 is a block diagram of a computer device 700 including an input device 702 remotely coupled to a processing component 708 making use of the input data transmitted by the input device. In the illustrated embodiment, the input device 702 is a biometric sensor such as, for example, a fingerprint reader, a retina/iris scanner, an audio input device for speech recognition, a camera sensor for facial feature recognition, or a DNA typing device.

The processing component 708 is a TPM that generates and maintains keys for the computer device 700. For example, the TPM may provide a set of cryptographic capabilities that enable the secure processing and usage of data transmitted by the input device within the TPM environment. In this regard, the TPM may include one or more cryptographic processors that perform cryptographic operations including, for example, encryption, decryption, authentication, and key management.

In the illustrated embodiment, the data transmitted by the sensor to the TPM is routed through the computer device via an insecure path. For example, the sensor may connect to a universal serial bus (USB) port 704 and a software driver 706 may be used to transfer the data from the USB port to the TPM. The software driver 706 is an insecure medium that may be subject to hacker or virus attacks.

In order to securely send the sensor data via the insecure software driver 706, the sensor is equipped with a security module 710 which may be similar to the security modules 208, 300, and 500 described above with reference to FIGS. 2, 3, and 5. According to one embodiment, the security module 710 engages in asymmetric key generation operation once after it boots up. The asymmetric key generation operation may be conducted in a secure environment, such as, for example, during a manufacturing flow.

The asymmetric key generation operation creates private and public portions of the asymmetric key. The security module 710 stores the private portion of the asymmetric key in its nonvolatile memory and exports the public portion of the asymmetric key. According to one embodiment, the public portion of the asymmetric key may be exported with a digital certificate. For example, the manufacturer of the sensor may export the public key and the certificate to the TPM during the manufacturing flow for establishing a secure communications channel between the sensor and the TPM. The certificate serves to verify that the public key is authentic, that the private key has not been disclosed outside the security boundary, and that the sensor that holds the private key provides a mechanism to securely receive, use and maintain keys. Thus, the certificate serves to strongly verify the authenticity of any information provided by the sensor that has the corresponding private key.

According to one embodiment of the invention, each time the computer device boots up, the sensor and TPM utilize the asymmetric key to negotiate one or more complementary keys for cryptographic processing. For example, the complementary keys, may be used to encrypt, decrypt, sign, and/or authenticate information sent between the sensor and the TPM. In this way, sensitive sensor information may be securely sent over the software interface 706 that may not otherwise be secure.

According to one embodiment of the invention, the binding of the input device 710 and the processing component 708 may be performed by an end user outside of the manufacturing flow. Such binding occurs when the processing component 708 is made aware of the input device 710 with which the processing component knows it can communicate securely. This may happen, for example, upon exporting the public portion of the asymmetric key generated by the input device 710 to the processing component 708.

According to one embodiment of the invention, a user may manually bind the processing component 708 and the input device 702 by accessing the processing component 708 and entering an identification of the input device 702 which causes the public portion of the asymmetric key to be exported to the processing component 708. Any digital certificate associated with the public portion of the asymmetric key provides assurance to the processing component 708 that the input device has a mechanism for protecting keys and that the private key of the input device was not exposed outside of the security boundary, and thus, is a trusted input device.

The ability for a user to bind input devices and processing components together outside of the manufacturing process may be desirable for computer add-on devices such as, for example, a sensor/reader, keyboard, joystick, mouse, telephone, scanner, and the like, that may be replaced from time to time, or for binding Bluetooth handsets to their respective telephones. When a new input device is coupled to the processing component, the processing component is to recognize the new add-on device as a trusted input in order for the input to securely transmit input data to the processing component for its use. Such a recognition may occur in response to the binding operation performed by the user instead of requiring it to occur during the manufacturing flow.

According to one embodiment of the invention, the input device is a Bluetooth-enabled handset which may be similar to the handset 102i illustrated in FIG. 1. The handset wirelessly communicates with a base telephone which may be similar to the telephone 110 illustrated in FIG. 1. The base phone includes a processing component which may be similar to processing component 104*d* including a cryptographic processor for decrypting and/or authenticating data transmitted by the handset. The cryptographic processor may be included within the security boundary provided by a HSM, TPM, or the like.

Data transmitted by the handset to the base phone traverses an insecure wireless medium. The data is therefore subject to eavesdropping and hacker attacks by unauthorized users. Other data stored within the handset or otherwise mobile phone, such as, for example, a stored phonebook, calendar, and the like, may also be subject to hacker attacks. In order to secure data generated by the handset, the handset is equipped with a security module which may be similar to the security modules 208, 300, and 500 described above with reference to FIGS. 2, 3, and 5.

According to one embodiment, the handset generates an asymmetric key pair, stores the private portion of the key in the security module, and exports the public portion of the key to the processing component of the base phone which then recognizes the handset as a trusted input device. The public portion of the key may be exported to the base phone upon providing to the processing component an identifier of the handset prior to use of the handset and base phone.

Once the binding between the handset and the base phone has occurred, the handset and base phone engage in key negotiations over the secure link that is created based on the binding. The key negotiations may occur each time, for example, the handset is put on-hook. Voice data transmitted by the handset is encrypted and/or signed using the generated key. The processing component of the base phone receives the encrypted and/or signed data and decrypts and/or authenticates the data within its security boundary for use by the processing component.

According to another embodiment of the invention, the input device is a biometric sensor or smart card reader (collectively referred to as a sensor) provided, for example, in a Bluetooth-enabled machine, such as, for example, a Bluetooth enabled vending machine. The sensor receives user identification information and forwards the information to a remote processing component for receiving authorization from the component for dispensing goods or services to the user. The remote processing component may reside, for example, in the user's Bluetooth-enabled mobile phone.

In order to securely send the user identification information to the remote processing component over the insecure wireless medium, the sensor in the vending machine is equipped with a security module which may be similar to the security modules 208, 300, and 500 described above with reference to FIGS. 2, 3, and 5. The sensor in the vending machine and the processing component in the mobile phone engage in asymmetric and/or symmetric key negotiations for generating cryptographic keys for secure transport of the user information to the processing component in the user's mobile phone.

In this regard, if the user desires to purchase a particular product from the vending machine, the user provides his identification information via the sensor in the vending machine. The security module within the sensor cryptographically processes the identification information using the asymmetric and/or symmetric keys, and forwards the processed information over a secure communications channel.

A processing component in the mobile phone receives the cryptographically processed information, decrypts any encrypted identification information, and compares it against the user's identification information stored within the security boundary of the processing component. For example, if the identification information is fingerprint data, the processing component compares the received fingerprint data with the stored fingerprint data to verify the user's identity.

The processing component further stores the user's debit/credit card information within the security boundary of the processing component. Upon verification of the user's identity, the processing component accesses the user's debit/credit information and provides authorization to the vending machine to dispense goods to the user. The authorization data, which may include the user's debit/credit information, is also transmitted to the vending machine over the secure communications channel.

According to one embodiment of the invention, the input device is a telephone which may be similar to the telephone 110 illustrated in FIG. 1. The telephone includes a biometric sensor, smart card reader, or keypad used by a user to enter his or her identification information. The identification information is forwarded to a remote access server over an untrusted medium such as, for example, the Internet.

The access server determines whether the user is entitled to particular services, such as, for example, long distance telephone services. The remote access server may be, for example, similar to the remote access server 112 illustrated in FIG. 1.

According to one embodiment of the invention, the telephone's input device is equipped with a security module similar to the security module 208, 300, and 500 discussed above with reference to FIGS. 2, 3, and 5. In this manner, the user's identification information may be securely transmitted to the remote access server over the untrusted medium.

The remote access server is equipped with a processing component which may be similar to the processing component 104*b* illustrated in FIG. 1. The processing component receives encrypted user identification information, decrypts the information, and determines whether the user is authorized for the particular services. Appropriate authorization information is then securely transmitted to the telephone based on the determination.

While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A method for secure handling of input data comprising:
   receiving the input data at a first integrated security module in an input device;
   storing the input data within a security boundary of the first integrated security module;
   establishing a secure communications channel on a short range communications link between the first integrated security module in the input device and a second integrated security module in a processing component by exchanging a temporary cryptographic key;
   encrypting the input data within the first integrated security module using the temporary cryptographic key; and transmitting the encrypted input data to the second integrated security module in the processing component over the secure communications channel.

2. The method of claim 1, wherein the establishing the secure communications channel includes generating an asymmetric key pair.

3. The method of claim 2, wherein the asymmetric key pair includes a private key and a public key, wherein the private key is stored within the first integrated security module and the public key is exported to the processing component.

4. The method of claim 2, wherein the asymmetric key pair is generated within the security boundary of the first integrated security module.

5. The method of claim 2, wherein establishing the secure communications channel on the short range communications link includes establishing the secure communications channel using the asymmetric key pair.

6. The method of claim 1, wherein establishing the secure communications channel includes generating a symmetric key.

7. The method of claim 1, wherein the first integrated security module encrypts the input data using the symmetric key.

8. The method of claim 1, wherein the input device is a sensor.

9. The method of claim 1, wherein the short range communications link is a wireless link.

10. The method of claim 1, wherein the short range communications link is a Bluetooth link.

11. A secure data processing system comprising:
an input device including a first integrated security module configured to store input data within a security boundary of the first integrated security module; and
a processing component, including a second integrated security module, coupled to the input device via a secure short range communications link established by exchanging a temporary cryptographic key with the input device, wherein the first integrated security module is configured to:
encrypt the input data within the first integrated security module using the temporary cryptographic key, and
transmit the encrypted input data to the second integrated security module over the secure short range communications link.

12. The system of claim 11, wherein an asymmetric key pair used for securing the input data includes a private key and a public key, and wherein the private key is stored within the first integrated security module and the public key is exported to the processing component.

13. The system of claim 12, wherein the asymmetric key pair is generated within a security boundary provided by the first integrated security module.

14. The system of claim 11, wherein the first integrated security module is configured to establish a secure communications channel on the short range communications link using an asymmetric key pair.

15. The system of claim 11, wherein the input device is configured to establish a secure communications channel on the short range communications link using a symmetric key.

16. The system of claim 11, wherein the first integrated security module is configured to encrypt the input data based on the symmetric key.

17. The system of claim 11, wherein the input device is a sensor.

18. The system of claim 11, wherein the short range communications link is a wireless link.

19. A secure data processing system comprising:
an input device, including a first integrated security module, configured to:
receive input data, and
store the input data within a security boundary of the first integrated security module of the input device, wherein the first integrated security module is configured to encrypt the input data within the first integrated security module using a temporary cryptographic key; and
a transmitter configured to:
establish, by exchanging the temporary cryptographic key with a processing component, a short range communications link with the processing component, and
transmit the encrypted input data to the processing component.

20. The system of claim 19, wherein the input device is configured to secure the input data based on an asymmetric key pair.

21. The system of claim 20, wherein the asymmetric key pair includes a private key and a public key, wherein the private key is stored within the first integrated security module and the public key is exported to the processing component.

22. The system of claim 20, wherein the asymmetric key pair is generated within a security boundary provided by the first integrated security module.

23. The system of claim 20, wherein the first integrated security module is configured to establish a secure communications channel on the short range communications link using the asymmetric key pair.

24. The secure data processing system of claim 19, wherein the input device is configured to establish a secure communications channel on the short range communications link using a symmetric key.

25. The secure data processing system of claim 19, wherein the first integrated security module is configured to encrypt the input data using the symmetric key.

26. The secure data processing system of claim 19 further comprising a sensor for receiving user identification information.

27. The secure data processing system of claim 19, wherein the short range communications link is a wireless link.

28. A method for secure handling of input data comprising:
receiving the input data at a first integrated security module in an input device;
storing the input data within a security boundary of a first integrated security module of the input device;
establishing, by exchanging a temporary cryptographic key with a processing component, a secure communications channel on a short range communications link between the first integrated security module in the input device and a second integrated security module in the processing component;
encrypting the input data within the first integrated security module using the temporary cryptographic key; and
transmitting the encrypted input data to the second integrated security module in the processing component over the secure communications channel, wherein the input device is bound to the processing component using input device identification information stored at the processing component during manufacturing of the processing component.

29. The method of claim 28, further comprising exporting a first cryptographic key to the processing component, wherein the first cryptographic key is a public portion of an asymmetric key.

30. The method of claim 29, further comprising:
securely providing to the input device a second cryptographic key using the first cryptographic key, wherein the second cryptographic key is a symmetric key; and
encrypting the input data using the second cryptographic key.

31. The method of claim 1, wherein the input device is bound to the processing component using input device identification information stored at the processing component.

32. The method of claim 31, wherein the binding between the input device and the processing component enables the processing component to recognize the input device as an authorized input device.

* * * * *